April 28, 1959 E. R. CARLBERG 2,884,270
LOCKING DEVICE FOR TELESCOPICALLY FITTED PARTS
Filed June 12, 1953 2 Sheets-Sheet 1
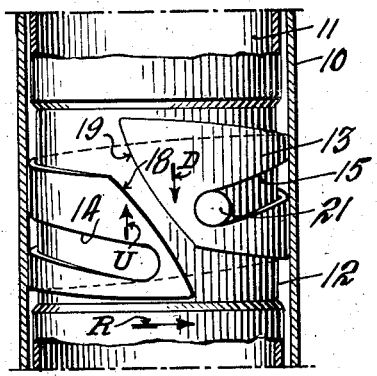
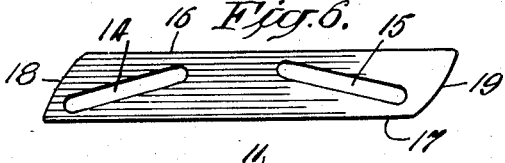
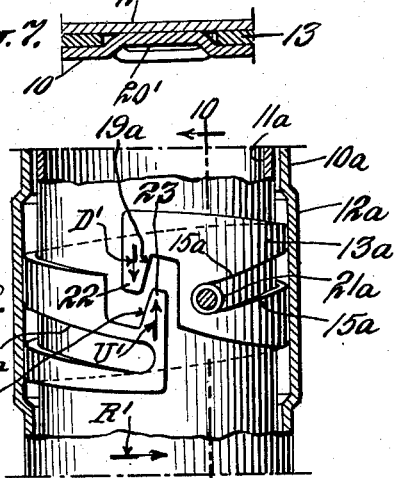
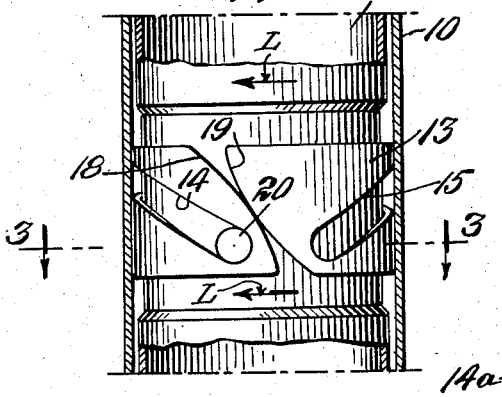
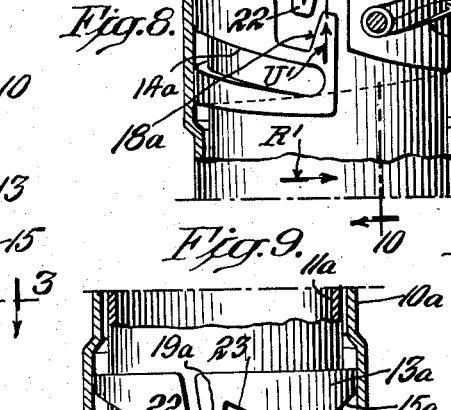
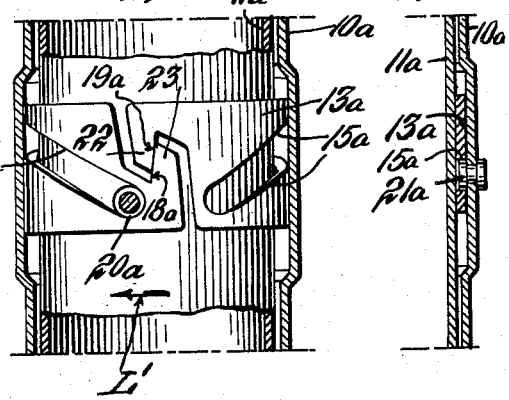
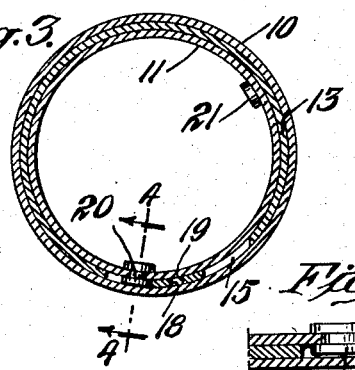
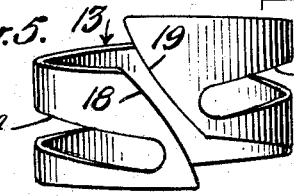
INVENTOR.
Erik Reinhold Carlberg
BY
his ATTORNEY April 28, 1959     E. R. CARLBERG     2,884,270
LOCKING DEVICE FOR TELESCOPICALLY FITTED PARTS
Filed June 12, 1953     2 Sheets-Sheet 2
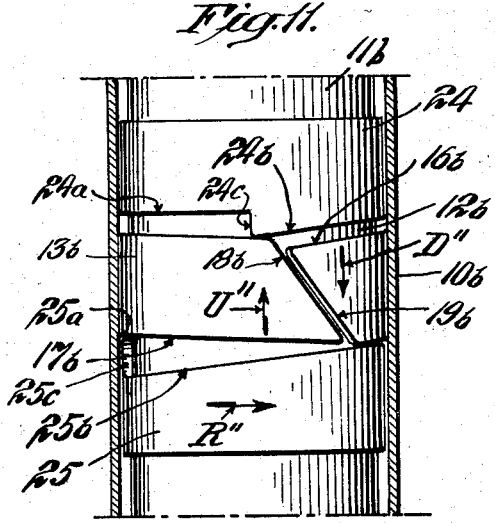
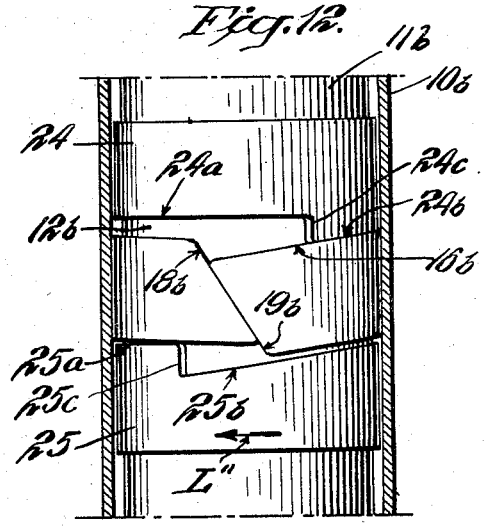
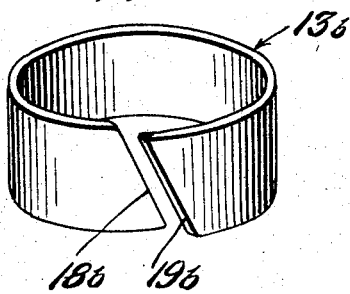
INVENTOR.
Erik Reinhold Carlberg
BY
ATTORNEY 2,884,270
Patented Apr. 28, 1959

2,884,270
LOCKING DEVICE FOR TELESCOPICALLY FITTED PARTS

Erik Reinhold Carlberg, Stockholm, Sweden, assignor to Aktiebolaget Elektrolux, Stockholm, Sweden, a corporation of Sweden Application June 12, 1953, Serial No. 361,330

Claims priority, application Sweden June 17, 1952

12 Claims. (Cl. 287—58)

My invention relates to a locking device for telescopically fitted parts.

An object of my invention is to provide an improved locking device of this type which is of simplified construction and effectively locks telescopically fitted parts simply by imparting relative rotative movement to the parts, such relative rotation of the parts causing the locking device to lock the parts together irrespective of the particular position the parts may take when fitted together and without any requirement for first turning and moving the parts of a particular position with respect to one another. I accomplish this by providing in the space between telescopically fitted parts a resilient element of annular form having opposing surfaces at opposite sides of a slit in spaced apart relation when the element is not distorted, the element being in frictional contact with one of the parts. When the parts are rotated relative to one another, the opposing surfaces of the element are caused to move into abutting relation to distort the element and produce a force having a radially directed component distributed about the periphery of the element which is effective to clamp and lock the telescopically fitted parts.

Further objects and advantages of my invention will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawings in which:

Fig. 1 is a view, partly in section, of my improved device for locking telescopically fitted parts;

Fig. 2 is a view similar to Fig. 1 illustrating another position of the locking device;

Fig. 3 is a view taken at line 3—3 of Fig. 2;

Fig. 4 is a view taken at line 4—4 of Fig. 3;

Fig. 5 is a perspective view of part of the construction of Figs. 1 and 2;

Fig. 6 is a view of the stamping or blank from which the part in Fig. 5 may be formed;

Fig. 7 is a view similar to Fig. 4 illustrating another form of construction for the embodiment of Figs. 1 and 2;

Figs. 8 and 9 are views similar to Figs. 1 and 2, respectively, illustrating another embodiment of the invention;

Fig. 10 is a view taken at line 10—10 of Fig. 8;

Figs. 11 and 12 are views similar to Figs. 1 and 2, respectively, illustrating a further embodiment of the invention; and Fig. 13 is a perspective view of part of the construction of Figs. 11 and 12.

Referring to the embodiment illustrated in Figs. 1 to 6 of the drawing, I have shown my improved locking device as applied to outer and inner tubular members 10 and 11, respectively, formed to fit telescopically one within the other.

In accordance with my invention the inner tubular member 11 is formed with an axially extending section 12 of reduced diameter arranged to receive a locking element 13 of cylindrical form. I make the locking element 13 by forming the sheet or blank, as shown in Fig. 6, with grooves 14 and 15 extending lengthwise of the longitudinal edges 16 and 17, and bending the blank to the cylindrical form shown in Fig. 5 with the opposing edges 18 and 19 separated and spaced from one another.

The locking element 13, which is resilient in character, is mounted in position by expanding the element sufficiently to enable it to be moved over an end portion of the inner tubular member 11 to the section 12 of reduced diameter, the locking element at the neck or section 12 assuming its undistorted shape, as seen in Figs. 1 and 5. In its mounted position at the neck section 12 of the inner tubular member 11, the locking element 13 is retained in place even when the outer tubular member 10 is withdrawn and separated from the inner tubular member 11.

The neck or section 12 of the inner tubular member 11 is provided with outwardly projecting pins or projections 20 and 21. As seen in Figs. 3 and 4, rivets may be secured in openings of the neck or section 12, the outer head portions of which may form the pins 20 and 21. When the locking element 13 is mounted in position on the neck or section 12 in the manner described above, one of the grooves 14 receives the pin 20 and the other groove 15 receives the pin 21.

In operating the locking device of Figs. 1 to 4, the inner tubular member 11 is inserted within the outer tubular member 10. When the tubular members are telescopically fitted together and the locking element 13 is in the undistorted position shown in Fig. 1, the tubular members 10 and 11 are freely movable axially with respect to one another. However, the locking element or sleeve 13 is in frictional contact with the inner wall surface of the outer tubular member 10 when the tubular members are in telescopic relation and the locking element is in its undistorted position.

When the different parts are in the position shown in Fig. 1 and the inner tubular member 11 is rotated toward the right, as indicated by the arrow R, and the outer tubular member 10 is held stationary, the locking element or sleeve 13 will also remain stationary due to the frictional contact of the locking element with the inner wall surface of the outer tubular member 10. Since the pins 20 and 21 are fixed to the neck or section 12 of the inner tubular member 11, the pins will also move to the right in Fig. 1, the direction of the arrow R, when the inner tubular member 11 is rotated in such direction. The action of pin 21 moving to the right in the groove 15 will cause the edge 19 of the locking element to move downwardly in the direction of arrow D in Fig. 1; and the action of pin 20 moving to the right in the groove 14 will cause the edge 18 of the locking element to move upwardly in the direction of the arrow U in Fig. 1.

The opposing edges 18 and 19 of the locking element 13 or sleeve are essentially parallel to one another and at an angle to the longitudinal axis of the element. When the opposing edges 18 and 19 of the locking element are moved a sufficient distance toward one another and adequate physical contact therebetween is effected, the locking element or sleeve 13 will be expanded and distorted to such an extent that it will be clamped against the inner wall surface of the outer tubular member 10. In effect, the expanding action of the locking element 13 produces a radially outward force which causes the element to grip and hold fast to the outer tubular member 10. When the inner tubular member 11 is rotated in the direction of the arrow R in Fig. 1 to cause expansion of the locking element 13, the clamping action of the expanded locking element against the outer tubular member 10, together with the frictional grip of the pins 20 and 21 in the grooves 14 and 15, respectively, effectively prevents imparting relative axial movement between the tubular members, the different parts coacting in such a way that the locking device is inherently self-locking in operation.

The different parts of the device are shown in a locked position in Fig. 2. In this locked position the opposing edges 18 and 19 abut one another and the pin 20 has been rotated toward the right as far as it can move in the groove 14. However, it will be understood that the different parts can be formed and arranged so that the locking element 13 will be fully expanded and the outer and inner tubular members 10 and 11 will be rigidly locked and connected together when the pin 20 has moved in the groove 14 to a position therein which is spaced and removed from the extreme right-hand end thereof seen in Fig. 2.

In order to unlock the tubular members 10 and 11 and move them axially with respect to one another, the outer tubular member 10 is held stationary and the inner tubular member 11 is rotated to the left, as indicated by the arrows L in Fig. 2. The locking element 13 will remain stationary as the pins 20 and 21 rotate to the left in the grooves 14 and 15, respectively, with rotation of the inner tubular member 11. When the pins reach the extreme left-hand ends of the grooves, as indicated by the position of pin 21 in groove 15 in Fig. 1, further continued rotation of the inner tubular member 11 will also cause the locking element 13 to rotate with the inner member 11, thereby overcoming the frictional contact of the locking element with the inner wall surface of the outer tubular member 10.

When the locking element 13 is no longer expanded and the opposing edges 18 and 19 are separated, as shown in Fig. 1, the tubular members 10 and 11 can be freely moved axially with respect to one another. In Figs. 1, 2 and 5 it will be observed that the grooves 14 and 15 both slope downwardly toward the opposing edges 18 and 19. As shown in Fig. 6, this is accomplished by having the grooves 14 and 15 extend diagonally across the locking element 13 in opposite directions between the longitudinal edges 16 and 17. Stated another way, one of the grooves extends about the locking element 13 more or less like a left-hand thread and the other groove extends about the locking element more or less like a right-hand thread, thereby acting to bring the opposing edges 18 and 19 toward one another when the inner tubular member 11 is moved in the direction of the arrow R with respect to the outer tubular member 10, as indicated in Fig. 1.

While the pins or projections 20 and 21 are formed by rivets in the embodiment of Figs. 1 to 4 which has just been described, it should be understood that such pins or projections may be formed in different ways. For example, the pins or projections may be formed by punching out wall regions of the inner tubular member 11. Such a punched out wall region forming a pin or projection 20', movable in the groove 14 of locking element 13, is shown in Fig. 7.

Another form of my improved locking device is shown in Figs. 8 to 10 which differs from the embodiment of Figs. 1 to 4 in that the outer tubular member 10a is formed with an axially extending section 12a of increased diameter to receive the locking element 13a of cylindrical form. In Figs. 8 to 10 rivets are fixed in openings of the section 12a, the inner head portions of which form inwardly extending pins or projections 20a and 21a which are adapted to move in grooves 14a and 15a, respectively, of the locking element 13a.

The locking element 13a is resilient in character and of such size that it is in frictional contact with the wall surface of the inner tubular member 11a when positioned thereon and not subjected to compressive force. The frictional contact between the locking element 13a and inner tubular member 11a, in the unlocked position of the different parts, is such that the tubular members 10a and 11a can be freely moved axially with respect to one another.

In the form of the locking device shown in Figs. 8 and 9, the grooves 14a and 15a are generally similar to and like the grooves 14 and 15 in Figs. 1 and 2. The ends of the locking element 13a are formed with hooks 22 and 23, the hook 22 projecting downwardly and the hook 23 projecting upwardly. As shown in Figs. 8 and 9, the hooks are formed with opposing inner edges 18a and 19a, respectively, which are essentially parallel to one another and both of which are inclined to the longitudinal axis of the locking element 13a.

In operating the locking device of Figs. 8 and 9, the inner tubular member 11a is inserted within the outer tubular member 10a, the locking element 13a being of such size that it will allow the inner tubular member 11a to pass therethrough, as just explained. When the tubular members are telescopically fitted together and the locking element 13a is in the position shown in Fig. 8, the tubular members 10a and 11a are freely movable axially with respect to one another. When the different parts are in the position shown in Fig. 8 and the outer tubular member 10a is rotated toward the right, as indicated by the arrow R', and the inner tubular member 11a is held stationary, the locking element or sleeve 13a will also remain stationary due to the frictional contact of the locking element with the wall surface of the inner tubular member 11a. Since the pins 20a and 21a are fixed to the section 12a of the outer tubular member 10a, the pins will also move to the right in Fig. 8, in the direction of the arrow R', when the outer tubular member 10 is rotated in such direction. The action of pin 21a moving to the right in the groove 15a will cause the edge 19a of the locking element to move downwardly in the direction of arrow D' in Fig. 8; and the action of pin 20a moving to the right in groove 14a will cause the edge 18a of the locking element to move upwardly in the direction of the arrow U' in Fig. 8.

When the opposing edges 18a and 19a of the hooks 22 and 23 are moved a sufficient distance toward one another and adequate physical contact therebetween is effected, the end portions of the locking element 13a will be drawn toward each other and the locking element will be compressed and clamped against the outer wall surface of the inner tubular member 11a. In the embodiment being described, therefore, the compressing action of the locking element 13a produces a radially inward force which causes the element to grip and hold fact to the inner tubular member 11a. This clamping action of the compressed locking element against the inner tubular member 11a, together with the frictional grip of the pins 20a and 21a in the grooves 14a and 15a, respectively, effectively prevents imparting relative axial movement between the tubular members, the different parts coacting in such a way that the locking device of Figs. 9 and 10 is also inherently self-locking in operation in the same manner as the embodiment of Figs. 1 to 4 described above.

The different parts of the device being described are shown in a locked position in Fig. 9. In order to unlock the tubular members 10a and 11a and move them axially with respect to one another, the inner tubular member 11a may be held stationary and the outer tubular member 10a rotated to the left, as indicated by the arrow L' in Fig. 9. The locking element 13a will remain stationary as the pins 20a and 21a rotate to the left in the grooves 14a and 15a, respectively, with rotation of the outer tubular member 10a. When the locking element 13a is no longer firmly clamped and locked about the inner member 11a and the opposing edges 18a and 19a are separated, as shown in Fig. 8, the tubular members 10a and 11a can be freely moved axially with respect to one another, the force applied to effect such relative movement only being sufficient to overcome the frictional contact of the locking element 13a against the inner tubular member 11a in the unlocked position of the different parts.

In Figs. 11 to 13 I have illustrated another embodiment of my improved locking device in which grooves in the locking element and pins cooperating therewith are not required. In the embodiment of Figs. 11 to 13 the inner tubular member 11b is formed with a neck portion or section 12b of reduced diameter, the top and bottom shoulders 24 and 25 of which serve as guide surfaces and are shaped to act upon the longitudinal edges 16b and 17b of the locking element or sleeve 13b and cause the element to expand when it is rotated with respect to the inner tubular member 11b.

The top and bottom shoulders 24 and 25 may include straight portions 24a and 25a which are essentially perpendicular to the longitudinal axis of the neck portion 12b and sloping portions 24b and 25b which are inclined to and at an acute angle to the axis of such neck portion. By way of example and for purposes of illustration only, the inclined or sloping portion 24b of the top shoulder 24 may extend about the periphery of the inner tubular member 11b for an angular distance of about 145° and the inclined or sloping portion 25b of the bottom shoulder 25 may extend about the periphery of the inner member 11b for an angular distance of about 175°; and the points or abutments 24c and 25c at the top and bottom shoulders, at the juncture of the straight and sloping portions, may be offset vertically from one another for an angular distance of about 60°.

The locking element 13b which is of sleeve-like form, as shown in Fig. 13, is resilient in character and may be expanded sufficiently to enable it to be moved over an end section of the inner tubular member 11b to the neck portion 12b, the locking element 13b at the neck portion assuming its undistorted shape, as seen in Figs. 11 and 13. In its mounted position at the neck portion 12b, the locking element 13b is retained in place even when the outer tubular member 10b is withdrawn and separated from the inner tubular member 11b.

In operating the form of locking device illustrated in Figs. 11 to 13, the inner tubular member 11b is inserted within the outer tubular member 10b. When the tubular members 10b and 11b are telescopically fitted together and the locking element 13b is in the undistorted position shown in Fig. 11, the tubular members are freely movable axially with respect to one another. However, the locking element or sleeve 13b is in frictional contact with the inner wall surface of the outer tubular member 10b when the tubular members are in telescopic relation and the locking element is in its undistorted position.

When the different parts are in the position shown in Fig. 11 and the inner tubular member 11b is rotated toward the right, as indicated by the arrow R", and the outer tubular member 10b is held stationary, the locking element or sleeve 13b will also tend to remain stationary due to the frictional contact of the locking element with the inner wall surface of the outer tubular member 10b. Since the top and bottom shoulders or guide surfaces 24 and 25 are formed on the inner member 11b, the guide surfaces will also rotate to the right in Fig. 11, in the direction of the arrow R", when the inner tubular member 11b is rotated in such direction. The top abutment 24c and lowest region of the sloping portion 24b adjacent to such abutment, in moving to the right with respect to the sleeve 13b, will impart a downward force to the longitudinal edge 16b and cause the edge 19b of the sleeve or locking element to move downwardly in the direction of the arrow D" in Fig. 11; and the bottom abutment 25c, also moving to the right with respect to the sleeve, will impart an upward force to the longitudinal edge 17b and cause the edge 18b of the locking element to move upwardly in the direction of the arrow U" in Fig. 11.

When the opposing edges 18b and 19b of the locking element are moved a sufficient distance toward one another and adequate physical contact therebetween is effected, the locking element 13b will be expanded and distorted to such an extent that it will be clamped against the inner wall of the outer tubular member 10b in the same way the outer and inner tubular members 10 and 11 are locked together in the embodiment of Figs. 1 to 4 and described above. The clamping action of the expanded locking element 13b against the outer tubular member 10b, together with the frictional grip of the top and bottom shoulders 24 and 25, at the abutments 24c and 25c and regions adjacent thereto, against the top and bottom longitudinal edges 16b and 17b of the locking element, effectively prevents imparting relative axial movement between the tubular members, the different parts coacting in such a way that the locking device is inherently self-locking in operation in the same manner as the previously described embodiments.

The different parts of the device being described are shown in a locked position in Fig. 12. In order to unlock the tubular members 10b and 11b and move them axially with respect to one another, the outer tubular member 10b may be held stationary and the inner tubular member rotated to the left, as indicated by the arrow L" in Fig. 12. The locking element 13b will remain stationary as the shoulders 24 and 25 rotate to the left, with rotation of the inner tubular member 11b. When the locking element 13b is no longer firmly clamped against the outer tubular member 10b and the opposing edges 18b and 19b are separated, as shown in Fig. 11, the tubular members 10b and 11b can be freely moved axially with respect to one another, the force applied to effect such relative movement only being sufficient to overcome the frictional contact of the locking element 13b against the outer tubular member 10b in the unlocked position of the different parts.

In view of the foregoing it will be clear that I have provided an improved locking device for telescopically fitted parts which is of simplified construction and effectively locks such parts simply by rotating the parts with respect to one another after being fitted together. The single act of rotating the parts relative to one another causes the locking device to lock the parts together irrespective of the particular position the parts may take when one is fitted telescopically within the other. Hence, there is no requirement, when it is desired to lock the telescopically fitted parts, to first turn and move the parts to a particular position with respect to one another. This is especially useful when telescopically fitted parts are frequently separated and connected to one another, such as, for example, during operation of a vacuum cleaner when tubular fittings and nozzles are changed from time to time.

Although I have shown and described several embodiments of my improved device for locking telescopically fitted parts, I do not desire my invention to be limited to the particular arrangements set forth, and I intend in the succeeding claims to cover all modifications which do not depart from the spirit and scope of my invention.

What is claimed is:

1. An outer tubular member and an inner member which telescopically fits within said outer member, a locking device comprising a sleeve-like element which, when said members are in telescopic relation, is disposed between said members and in frictional contact with one of said members, said sleeve-like element having an axially extending slit, and means operable to move opposing edges of the slit in said sleeve-like element against each other to distort said element and firmly clamp said members together responsive only to imparting relative rotative movement to said members and without effecting axial movement of said members with respect to one another, said last-mentioned means including structure fixed to the other of said members which coacts with said sleeve-like element.

2. A locking device as set forth in claim 1 in which said sleeve-like element is formed with a circumferentially extending groove and said structure fixed to the other of said members includes a part extending into and movable in said groove.

3. A locking device as set forth in claim 1 in which said sleeve-like element, transverse to the longitudinal axis thereof, is formed with an end edge, and said structure fixed to the other of said members includes a part which coacts with such end edge.

4. An outer tubular member and an inner member having a wall surface of cylindrical form which telescopically fits within said outer member, a locking device comprising a sleeve-like element which, when said members are in telescopic relation, is disposed between said members with the outer surface thereof in frictional contact with the inner wall surface of said outer tubular member, the inner surface of said sleeve-like element being essentially concentric with respect to the outer surface thereof, and means fixed to the inner member for expanding said sleeve-like element and firmly clamping said members together, said means being responsive solely upon imparting relative rotative movement to said members and without effecting axial movement of said members with respect to one another to expand said element and firmly clamp said members together.

5. A locking device as set forth in claim 4 in which said inner member is provided with a section of reduced diameter to receive said sleeve-like element.

6. An outer tubular member and an inner member having a cylindrical wall surface which telescopically fits within said outer member, a locking device comprising a sleeve-like element which, when said members are in telescopic relation, is disposed between said members with the inner surface thereof in frictional contact with the outer wall surface of said inner member, and means fixed to the outer member for contracting said sleeve-like element and firmly clamping said members together, said means being responsive solely upon imparting relative rotative movement to said members and without effecting axial movement of said members with respect to one another to contract said element and firmly clamp said members together.

7. A locking device as set forth in claim 6 in which said outer tubular member is provided with a section of increased diameter to receive said sleeve-like element.

8. An outer tubular member and an inner member which telescopically fits within said outer member, a locking device comprising an element of annular form having an axially extending slit, said element being resilient in character with the opposing surfaces at the edges of the slit normally being in spaced apart relation, said element, when said members are in telescopic relation, being disposed therebetween and in frictional contact with one of said members, and means fixed to the other of said members which coacts with said element for moving the opposing surfaces of the slit into abutting relation to distort said element and produce a force having a radially directed component distributed about the periphery of said element to firmly clamp and lock said members together, said last-mentioned means being rendered operable to firmly clamp and lock said members only upon imparting relative rotative movement to said members, and without effecting axial movement of said members with respect to one another, to cause the opposing surfaces at the edges of the slit to move into said abutting relation.

9. A locking device as set forth in claim 8 in which the opposing surfaces at the edges of the slit are at an angle to the longitudinal axis of said inner and outer members.

10. A locking device as set forth in claim 8 in which said means fixed to the other of said members includes a part operable to bring the opposing surfaces at the edges of said element into said abutting relation and the slit contracts when distorted to produce a force having a component which is directed radially inward about the periphery of said element to firmly clamp and lock said members together, said element having oppositely directed hooks whose inner edges form the opposing surfaces at the edges of the slit.

11. A locking device as set forth in claim 8 in which said element is formed with a pair of grooves, and said means fixed to the other of said members includes a pair of parts, each of said parts being movable in one of said grooves.

12. A locking device as set forth in claim 11 in which said grooves extend circumferentially about said element, said grooves sloping in opposite directions axially of said element.

References Cited in the file of this patent

UNITED STATES PATENTS

| | | |
|---|---|---|
| 602,149 | White | Apr. 12, 1898 |
| 1,326,623 | Voight | Dec. 30, 1919 |
| 2,369,942 | Brown | Feb. 20, 1945 |
| 2,526,415 | Refsdal | Oct. 17, 1950 |
| 2,599,222 | Bergqvist et al. | June 3, 1952 |
| 2,648,247 | Schmuziger | Aug. 11, 1953 |

UNITED STATES PATENT OFFICE
CERTIFICATE OF CORRECTION

Patent No. 2,884,270            April 28, 1959

Erik Reinhold Carlberg

It is hereby certified that error appears in the printed specification of the above numbered patent requiring correction and that the said Letters Patent should read as corrected below.

Column 1, line 26, for "of a" read -- to a --; column 2, line 51, after "Fig. 1," insert -- in --; line 66, for "wall" read -- will --; column 4, line 36, for "10" read -- 10a --; line 53, for "fact" read -- fast --; column 8, line 26, for "said element" read -- the slit --; lines 26 and 27, for "the slit" read -- said element --.

Signed and sealed this 3rd day of November 1959.

(SEAL)

Attest:

KARL H. AXLINE
Attesting Officer

ROBERT C. WATSON
Commissioner of Patents